D. BOSQUI.
PROCESS OF PRECIPITATING MATERIALS FROM SOLUTIONS.
APPLICATION FILED DEC. 9, 1911.
1,049,560.
Patented Jan. 7, 1913.
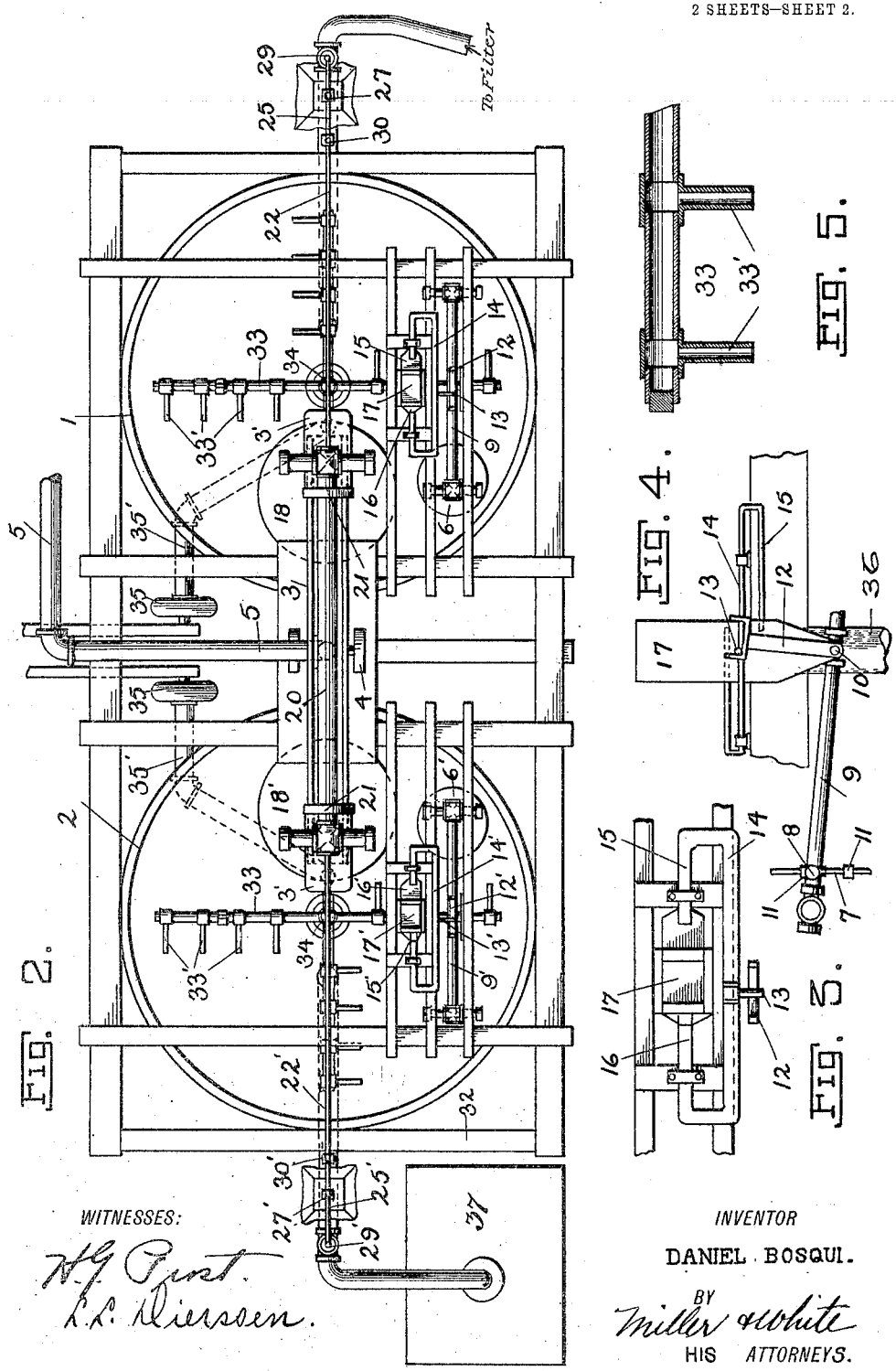
WITNESSES:
INVENTOR
DANIEL BOSQUI.
BY
HIS ATTORNEYS.

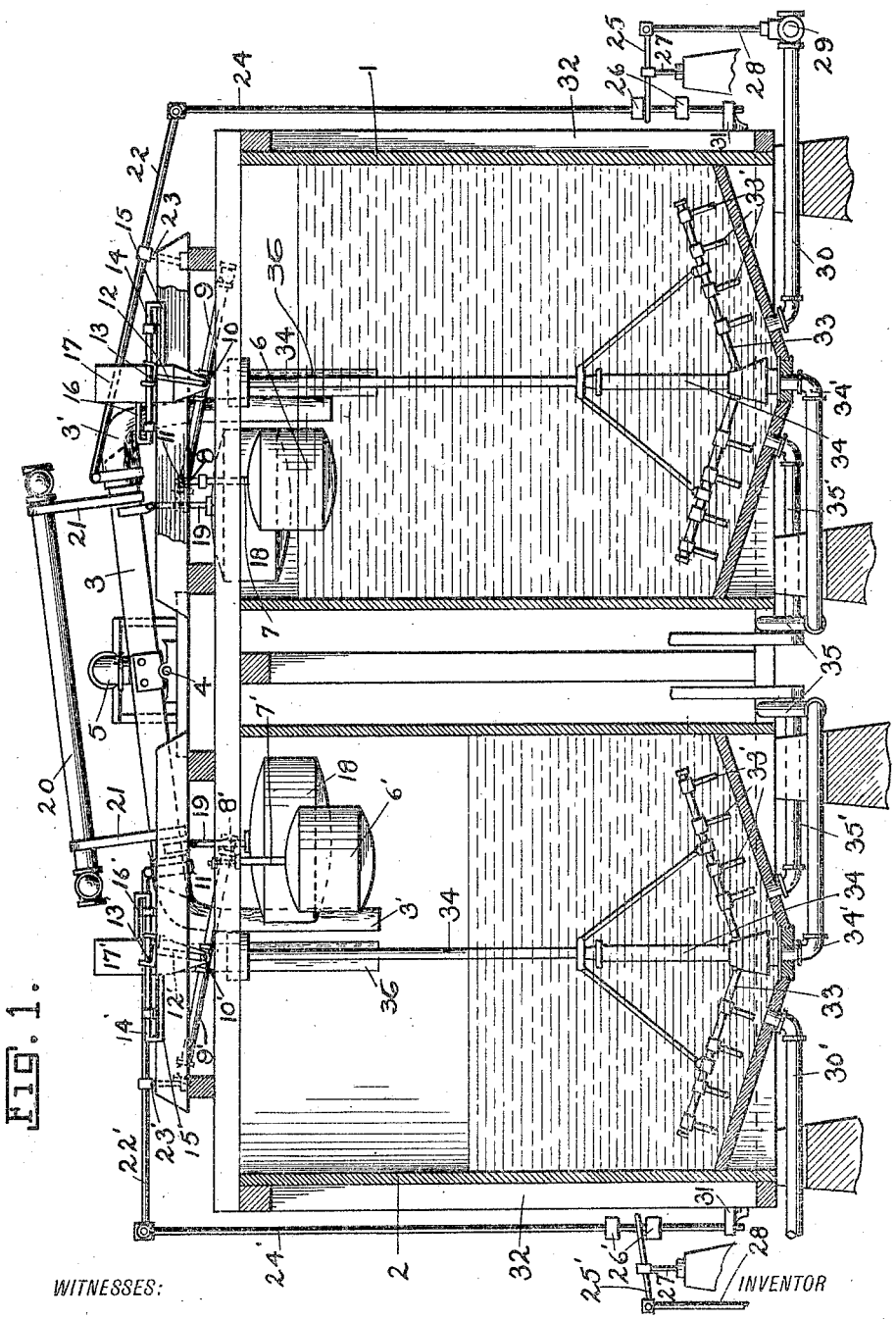

UNITED STATES PATENT OFFICE.

DANIEL BOSQUI, OF MONAHAN, WASHINGTON, ASSIGNOR TO MERRILL METALLURGICAL COMPANY, A CORPORATION OF CALIFORNIA.

PROCESS OF PRECIPITATING MATERIALS FROM SOLUTIONS.

1,049,560. Specification of Letters Patent. Patented Jan. 7, 1913.

Application filed December 9, 1911. Serial No. 664,745.

*To all whom it may concern:*

Be it known that I, DANIEL BOSQUI, citizen of the United States, and a resident of Monahan, in the county of King and State of Washington, have invented certain new and useful Improvements in the Process of Precipitating Materials from Solutions, of which the following is a specification.

This application relates to an improved process of recovering valuable metals from solution and particularly metals from hydrometallurgical solutions.

In practice, metallic zinc-bearing materials or other metalliferous precipitants have heretofore been used to precipitate metals from cyanid solutions and the most practical results have been obtained by adding such metalliferous precipitant to the solution in a closed receptacle or in such manner that the air has been excluded from the mixture of solution, precipitant and precipitate and subsequently conducting the mixture without additional agitation through a filter. By this method, however it is difficult to adjust or prolong the contact between the solution and precipitant in accordance with the requirements of solutions low in cyanid content.

In practice zinciferous precipitants have been used to precipitate cyanid solutions in the following ways. Said precipitants have been added to the solution and the mixture agitated usually by compressed air, and occasionally by mechanical stirrers. In either event an entrainment of material amounts of the oxygen of the air has resulted, which oxygen is a serious deterrent to the most efficient precipitation, which is a reducing reaction. For the purpose of best obviating this oxygenation, metalliferous precipitants have been added to the solution in a closed circuit and the mixture conducted without rest, without exposure to the atmosphere, and without prolonged agitation to a closed filter. In the latter method, however, it is difficult to adjust or prolong the contact between the solution and precipitant, which prolonged and adjustable contact is desirable when the solutions are low in strength or otherwise feeble in activity toward the precipitant.

In the present process the time of contact of the precipitant with the solution may be prolonged and regulated to obtain the best results, depending upon the circumstances of operation, and the precipitant may be recirculated through the solution so that it is continually brought into effective contact with the solution without subjecting the mixture of solution, precipitant and precipitate to the deleterious effects of entrained air, as is the case when the surface of the mixture is markedly agitated by means of mechanical agitators or when the mixture is agitated by compressed air.

The object of the invention is to provide an improved method of precipitating and recovering valuable metals from solution and particularly metals from hydro-metallurgical solutions.

The process possesses other advantageous features, which with the foregoing will be set forth at length in the following description, where I shall more fully describe the process and outline in full the preferred form of apparatus for carrying out said process.

The preferred form of apparatus is illustrated in the drawings accompanying and forming part of the present specification.

The novelty of the invention will be included in the claims succeeding said description. From this it will be apparent that I do not restrict myself to the showing made by said drawings and description, as I may adopt many variations within the scope of my invention as expressed in said claims.

Referring to the drawings, which disclose the preferred form of apparatus for carrying out my process:—Figure 1 is a side elevation of the apparatus with the receiving tanks in vertical section, one of said tanks being shown filled with solution and its outlet valve opened for the discharge thereof, the companion tank being partly filled with liquid and its outlet valve closed. Fig. 2 is a top or plan view of the apparatus as shown in Fig. 1. Fig. 3 is a side elevation of the zinc dust or precipitant receptacle illustrating the slide arm carrying the cutter blades and the tilting lever for actuating the slide arm. Fig. 4 is a detail plan view of the zinc dust receptacle and the slide arm carrying the cutter blades movable within the zinc dust receptacle and controlling the discharge therefrom. Fig. 5 is a fragmentary sectional view of one of the arms of the rotary agitator which is positioned in each of the receiving tanks.

In the drawings I have illustrated an apparatus for continuously and automatically carrying on the process by the use of a plurality of receiving tanks, but it is understood that the process may be carried on intermittently or continuously by the use of one tank when desired.

The cyanid solution to be treated is conducted to the tank and at a certain predetermined point in the filling thereof, determined by the rate of the rise of the solution in the tank, and the characteristics of the solution, a predetermined amount of precipitant is added to the solution. The mixture of solution, precipitant and precipitate, is then agitated in such manner that the upper or exposed surface thereof remains substantially placid and no air is entrained in the solution. The solution still flowing into the tank in the preferred form of apparatus shown is deposited in such manner that the surface of the solution is not markedly disturbed. The only contact of the mixture with air that possibly takes place is through the surface exposure, which, on account of the quiescent state of the surface is a negligible quantity. As the cyanid solution continues to flow into the tank, the level of the mixture of solution, precipitant and precipitate therein rises, and at a determined height, the supply of solution is cut off and the discharge valve of the tank opened, allowing the mixture therein to be conducted to the filter in which the precipitates are removed. In the apparatus shown in the accompanying drawings this process is carried on continuously and automatically.

The mechanism for controlling the flow of the cyanid solution and cutting off the supply thereof, regulating the feed of the zinc dust, and governing the discharge of the mixture is identical in connection with each of the receiving tanks, likewise the means employed for maintaining mixture in an agitated condition.

The numerals 1 and 2 are employed to designate the receiving tanks within which the cyanid solution to be precipitated is alternately delivered, the cyanid solution being delivered to the said tanks respectively by means of a tilting launder 3, supported at its center on the journals 4, which launder receives the solution to be treated from the feed pipe 5.

Attached to the ends of the launder 3 are conductors or chutes 3′ formed preferably of canvas or other flexible material, which convey the solution from the launder to the tank. These conductors 3′ extend downward to a position adjacent to the lower surface of the floats 6—6′ so that the lower ends thereof are immersed in the solution in the tank before the float is raised. This arrangement allows the solution to be deposited in the tank without markedly disturbing the surface of the mixture therein, after the precipitant has been added. By maintaining a substantially placid surface, no air is entrained in the mixture and the detrimental effects thereof are obviated.

Referring now more particularly to tank 1, as the solution delivered therein by the launder 3 approaches the filling point thereof, predetermined by the length of contact required for the zinc dust to be supplied thereto, the solution acts against the float 6 suspended within said tank and raises the same, the stem 7 of which float works through a guide 8 clamped to the inner end of the tilting lever 9. This lever consists of a tubular rod or pipe, partly filled with quicksilver and supported centrally on the journal 10. To the stem 7 are secured above and below the guide 8 the collars 11, the lower one of which on the upward movement of the float raises the inner end of the pivoted or tilting lever 9. Attached to the said lever and projecting upwardly centrally therefrom is a forked arm 12, the free end of which, depending on the upward and downward movement of the float 6, engages with a pin 13 projecting laterally from a horizontally slidable arm 14 and moves the same inwardly and outwardly. This slide arm carries the cutter blades 15 and 16, which move within the zinc feed box or receptacle 17 from opposite sides, working within milled grooves in said box. The cutter blades are separated or spaced apart and the inner end of the blade 16 overlaps the inner end of the blade 15 for a slight distance, about one-half an inch, so that when the blade 16 makes its return stroke from within the box 17, the same moving in unison with the blade 15 no zinc dust feeds out of the box. As the inner end of the lever 9 is carried past the horizontal by the uprise of the float 6, the quicksilver contained therein flows to the opposite end of the tube lever 9 and the forked arm 12, attached to the said lever impinges on the pin or stud 13 and shifts the arm 14 to move the cutter 16 within the feed box 17 and the cutter 15 from within the same, allowing the zinc dust to drop within the tank 1, the amount or charge of the zinc dust depending on the inside measurement of the feed box 17 and the distance that the cutter blades 15 and 16 are spaced apart. The zinc dust is preferably conveyed from the feed box 17 to the solution in the tank through a canvas chute 36 which is formed of such length that the lower end thereof lies below the surface of the solution, before the zinc dust is added to the solution.

After the charge of zinc dust has been discharged within the tank 1, the mixture continuing to rise therein actuates the float 18 and through the connection of its stem 19 with the launder 3, raises such end of the said tilting launder, and as the same is carried above the horizontal position, elevates such end of the pipe 20, containing quicksilver, which pipe is connected to the pivoted launder 3 at each end by the supports 21. During this movement of the tube 20 the quicksilver contained therein is shifted toward the lowered end thereof, while at the same time the inner end of the lever 22 is raised and the outer end thereof depressed, the said lever being fulcrumed to the swinging link 23, which allows for the arc made by the launder during its tilting movement. As the inner end of the lever 22 is raised or elevated, its outer end is depressed, which being connected to the vertically movable rod 24 actuates the same to operate the valve controlling the outflow of the mixture of solution, precipitant and precipitate from within the tank 1. The lower end of the rod 24 works through the slotted lever 25, which is acted on by the collars 26 adjustably secured to said rod above and below the lever 25. The lever 25 is fulcrumed at 27 and the outer end thereof is connected to a stem 28 projecting from the controlling valve 29 situated within the outlet pipe 30, consequently when the upper collar 26 acts against the inner end of the lever 25 on the downward movement thereof, the same is carried therewith and its outer end thrown upwardly, drawing therewith the stem 28 and raising or unseating the valve 29 to permit the outflow of the mixture from within the tank 1 through the outlet pipe 30, permitting the mixture to run to the usual filtering medium 37.

The zinc feeder having been operated by the float 6 and subsequently the float 18 having operated the tilting or swinging launder 3 and at the same time operated the valve 29 for allowing the escape of the mixture from tank 1, the gold and silver bearing solution will now be flowing from the launder 3 into the tank 2, the outlet valve 29' of which is closed. The operation of the working parts for said tank controlling the shifting of the swinging or tilting launder 3, the feed of zinc dust into the solution flowing into the said tank and the operation with tank 1, that is as the float 6' is acted on by the inflowing solution the same is raised and through its stem 7' working through a guide 8' clamped to a tilting lever 9' consisting of a tube partly filled with quicksilver, the feed of zinc dust is delivered to the solution flowing into the said tank 2. The lever 9' is supported centrally on the journal 10', and to the stem 7' above and below the guide 8' the collars 11' are secured.

To the lever 9' is secured a projecting forked arm 12', which acts against a pin or stud 13' projecting from the horizontally slidable arm 14', carrying the cutter blades 15' and 16' working through the zinc dust feed fob or receptacle 17', the arrangement and working thereof being the same as the cutter blades 15 and 16. After the float 6' has raised its full distance, the continued rise of the mixture raises the secondary float 18', the stem 19' of which is connected to the end of the launder 3 opposite to that at which the stem 19 is attached, the upward movement of the float 18' raising the depressed end of the launder 3 above the horizontal arm which carrying therewith the tube 20 shifts the quicksilver contained therein to the opposite end thereof, at the same time the movement of the launder raising the inner end of the lever 22', fulcrumed at 23' and depressing the outer end thereof, forcing downwardly the rod 24', which acts to depress the inner end of the lever 25' fulcrumed at 27', and raise the outer end thereof, lifting the stem 28' to unseat the valve 29' and permit the outflow of the mixture through the outlet pipe 30' On the rod 24, above and below the lever 25' are secured the collars 26', which act against the free end of the lever 25' for raising and lowering the inner end thereof in accordance with the movement of the actuating rod 24'. The lower end of each actuating rod 24 and 24' works through a guide 31 secured to and projecting from the frame 32 of the apparatus, by the upper frame pieces of which the tilting members of the apparatus are supported.

It will be understood that as the actuating mechanism for one tank is thrown into operation by the filling of the same with cyanid solution to be precipitated the mixture contained in the companion tank is being withdrawn, and that as the raising of the floats in one tank shifts the position of the operating mechanism for one tank, the lowering of the floats in the companion tanks act to place the operating mechanism in a reverse position to that assumed by the corresponding parts of the tank being filled with solution for precipitation.

In each tank is located an agitator 33, each being carried by a vertical shaft 34. The tubular radial arms of the agitator are provided with depending inclined nipples or nozzles 33', and each agitator is connected by a pipe 34' to a centrifugal pump 35, which takes liquid from within the tank by means of a suction pipe 35'. The liquid thus drawn from the tank is forced by the centrifugal pump 35 back into the agitator 33 through the discharge pipe 34', the pressure of the liquid thus forced into the agitators escapes through the nozzles 33', causing the agitators to be rotated at a suitable speed. The disposition of the nozzles or nipples 33' relative to the tubular radial arms of the agitators is such, that at each complete revolution of the agitators the discharge from the nozzles or nipples, which are arranged at an angle to the bottom of the links, sweeps the entire surface of the bottom of the tanks.

The disturbance of the mixture caused by the agitator is such that the upper surface thereof is not affected thereby and remains placid after it has reached the level at which the precipitant is deposited in the solution.

The jets of liquid striking the bottom of the tank prevent any settlement of the precipitates. Through the agency of the agitators an agitation of the solution is maintained that brings the zinc dust particles and the pregnant solution into intimate contact, while the circular motion of the tubular arms gives a rotary movement to the solution, and the jets of discharge create an upward current of solution, all tending to produce perfect agitation and prolonged contact between solution and precipitant and at the same time admitting or entraining no air to the solution. The only contact with air that can possibly take place is through the surface exposure of the solution which is a negligible quantity.

When the zinc dust is added to the solution, it sinks to the bottom where it is stirred up and mixed with the solution by the agitators. A portion of the zinc dust and particularly the heavier and larger particles thereof which have a greater tendency to settle to the bottom are continuously drawn from the tank with the solution passing through the pump and are discharged into the solution in the tank from the agitator nipples. This re-circulation of the precipitant causes an intimate recurring and prolonged contact with the pregnant solution and assists in producing a substantially complete and perfect precipitation. Furthermore, by this re-circulation, the size of these heavier and coarser particles is reduced by contact with the solution and a correspondingly greater amount of precious metal precipitated.

By the use of the described apparatus there is a positive feed of a predetermined quantity of zinc dust to a given quantity of cyanid to be precipitated, the flow of the solution for a single charge of the zinc dust therefor being automatically controlled, a positive time contact for the zinc dust with the solution is provided, which may be varied according to the requirements of the solution to be precipitated, and in individual cases may thereafter be fixed. At the same time the mixture is maintained in a continuous agitated condition during the entire operation of precipitation and the precipitant is re-circulated through the mixture without subjecting the mixture to the oxidizing effects of entrained air.

By "predetermined" in this specification is meant predetermined in a practical sense as metallurgically applied to the operation of reduction works. For instance a predetermined amount of zinc dust means the amount which has been found by previous operations to be sufficient to best meet the requirements of the general operation of the plant. Similarly predetermined time of contact means that period which experience has demonstrated gives the best average results, all things considered, for the economic and efficient operation of the works.

I claim:

1. The continuous method of treating cyanid solution for the precipitation of gold and silver therefrom, which consists in distributing the supply of solution alternately between a plurality of receiving vessels, delivering alternately to said vessels, during the filling thereof with solution, a predetermined charge of zinc dust, withdrawing the treated solution from one vessel during the filling of the other vessel with the solution to be treated.

2. The continuous method of treating cyanid solution for the precipitation of material therefrom which consists in distributing the supply of solution alternately between a plurality of receiving vessels, delivering alternately to said vessels during the filling thereof with solution, a predetermined charge of a precipitant, withdrawing the treated solution from one vessel during the filling of the other vessel with the solution to be treated.

3. The process of precipitating materials from solution which consists in adding a predetermined amount of a precipitant to a predetermined amount of solution and agitating the mixture for a variable predetermined time, without materially disturbing the placidity of the exposed surface thereof.

4. The process of precipitating materials from solution which consists in automatically adding a predetermined amount of a precipitant to a predetermined amount of solution and agitating the mixture for a variable predetermined time without materially disturbing the placidity of the exposed surface.

5. The continuous method of treating cyanid solution for the precipitation of metals therefrom which consists in automatically distributing the supply of solution successively to a plurality of receiving vessels, delivering successively to said vessels at a predetermined time in the filling thereof, a predetermined charge of precipitant, agitating the mixture and withdrawing the same from one vessel during the filling of another with the solution to be precipitated.

6. The process of precipitating material from its solution which consists in adding a precipitant to said solution and re-circulating the precipitant through the solution.

7. The process of precipitating material from its solution which consists in adding a precipitant thereto, and agitating the mixture by re-circulating a portion of the precipitant therethrough.

8. The process of precipitating material from its solution which consists in adding a precipitant thereto, agitating the mixture for a predetermined time without entraining any air therein, and continually re-circulating some of the precipitant through the solution during said time.

9. The process of precipitating material from solution which consists in agitating the mixture of solution and precipitant by re-circulating the precipitant therethrough without entraining any air therein.

10. The process of precipitating material from a solution which consists in agitating the mixture of solution and precipitant by re-circulating the same through the containing receptacle without entraining air.

11. The process of precipitating material from a solution which consists in agitating the mixture of solution and precipitant by continuously re-circulating the same through the containing receptacle without entraining air.

12. The process of precipitating material from a solution which consists in agitating the mixture of solution and precipitant in a containing receptacle, withdrawing the same from the receptacle and conveying it through a closed circuit back into the receptacle and finally conducting the mixture from the receptacle through a closed circuit, all of said steps being continuous and without entraining air.

13. The process of recovering gold and silver from cyanid solutions which consists in agitating the mixture of solution and precipitant in a containing receptacle withdrawing the same from the receptacle and conveying it through a closed conduit back into the receptacle and finally conducting the mixture from the receptacle through a closed conduit to a filter press and there recovering the values, all of said steps being continuous and without entraining air.

In testimony whereof, I have hereunto set my hand at Issaquah, King Co., Washington, this 28th day of November, 1911.

DANIEL BOSQUI.

In presence of—
W. E. GIBSON,
IDA A. GIBSON.